United States Patent [19]

Albin

[11] 4,308,100
[45] Dec. 29, 1981

[54] APPARATUS FOR CHARGING A NUCLEAR REACTOR

[75] Inventor: Michel Albin, Vaucresson, France

[73] Assignee: Societe Franco-Americaine de Constructions Atomiques-Framatome, Vaucresson, France

[21] Appl. No.: 849,980

[22] Filed: Nov. 9, 1977

[30] Foreign Application Priority Data

Nov. 23, 1976 [FR] France ............................... 76 35175

[51] Int. Cl.³ ............................................. G21C 19/20
[52] U.S. Cl. ............................... 376/271; 294/86 A; 414/146; 376/268
[58] Field of Search ............................ 176/30, 31, 32; 214/18 N; 294/86 A; 414/146

[56] References Cited

U.S. PATENT DOCUMENTS

| 3,904,048 | 9/1975 | Van Santen | 176/30 |
|---|---|---|---|
| 3,909,350 | 9/1975 | Dupuy | 176/30 |
| 3,990,591 | 11/1976 | Street | 176/30 |
| 4,002,529 | 1/1977 | Andrea | 176/30 |
| 4,036,686 | 7/1977 | Weilbacher | 176/30 |
| 4,064,000 | 12/1977 | Andrea | 176/30 |

*Primary Examiner*—Donald P. Walsh
*Attorney, Agent, or Firm*—Haseltine and Lake

[57] ABSTRACT

Apparatus for charging a nuclear reactor disposed at the bottom of a pool. The reactor is constituted by a plurality of tiers of combustible assemblies having different stages of enrichment, each assembly having combustible rods and an auxiliary cluster associated with the particular tier of the assembly. The apparatus comprises a rolling bridge supported for movement in a plane above the pool, and carrying a turnable platform which supports a plurality of vertical telescopic manipulation arms arranged in angular spaced relation thereon. Each arm carries a respective grappling unit for respectively engaging a complete combustible assembly or at least one type of auxiliary cluster. The auxiliary clusters may include control clusters, sealing clusters and poison consumable clusters. In a particular embodiment three manipulation arms are provided one with a grappling unit to engage a complete combustible assembly a second with a grappling unit to engage a control cluster, and a third with a unit to engage a sealing cluster or a poison consumable cluster. The turnable platform has as many angular stop positions as there are telescopic arms and it has an active position at which each telescopic arm is selectively fixed in operative position. At the other angular positions, the arms are inactive. At the active position, each of the telescopic arms can be extended and retracted.

4 Claims, 5 Drawing Figures

APPARATUS FOR CHARGING A NUCLEAR REACTOR

FIELD OF THE INVENTION

The present convention relates to a machine for charging a nuclear reactor and more particularly to a machine adapted to achieve on the core of a nuclear reactor all new placements, liftings or transpositions of combustible assemblies or their auxiliary elements, such as, for example, control clusters or sealing clusters.

BACKGROUND

In the core of a nuclear reactor the active elements are constituted by vertically juxtaposed "combustible assemblies" each assembly itself combining a great number of combustible rods and an assembly, movable as a unit for emplacement in the reactor or for its extraction. These are the rods which comprise the combustible member itself.

For a better utilization of the combustible material and to render uniform the distribution of power in the reactor, the assemblies are distributed in three zones with different ranges of enrichment along the zones. One then proceeds with the recharging in successive tiers. In each operation one thus eliminates the elements whose combustible material is spent and which is disposed in the central portion of the reactor. One then replaces it with an equal number of elements from the peripheral portion of the reactor and one supplies this peripheral portion with assemblies containing fresh combustible material. Therefore, each recharging operation comprises a first series of manipulations of the assemblies including lifting, putting in place or transposition at the interior of the reactor.

It is also necessary to note that each combustible assembly is associated with auxiliary members capable of being interposed between the combustible rods and manipulable as a unit for each assembly in the form of a "cluster". The types of these members and the cluster which they form then varies according to the position of the assembly in the reactor. Thus certain assemblies are associated with "control clusters" carrying control rods of absorbent material adapted to regulate the reactivity of the reactor and to assure it's halt in the case of emergency. Other control clusters called "partial clusters" only include absorbent material over a portion of their length. Other clusters called "consumable poison" are introduced into the assemblies not provided with "control clusters" to permit reduction of the concentration of the dissolved boron in the primary water. Certain of these "consumable poison" clusters are also provided with rods containing neutron sources for effecting the starting of the reactor. Finally, certain combustible assemblies receive sealing clusters simply adapted to close the guide tubes which are not occupied by other types of rods.

It is therefore seen that for each recharging operation, it is necessary not only to displace or transpose the combustible assemblies but also most often to change the "cluster" with which each assembly is associated.

In the current conditions of use, the operations of recharging a combustible element require at least two or three manipulation devices. The first is a rolling bridge which is displaced on rails above the plane of the water of the pool of the reactor. It is provided with a telescoping arm which effects extraction from the core of the reactor of a complete assembly with its cluster and transfer of the assembly always under water, and always with its cluster up to the equipment zones disposed at the extremity of the pool of the reactor and comprising a machine for transposing the control clusters and a machine for transposing the sealing clusters. These manipulation devices are utilized to separate the clusters from the assemblies. The spent assemblies are then evacuated without their cluster towards the used combustible pool while the assemblies in transposition are generally equipped with new clusters introduced by the telescopic mast on the bridge, and the assemblies are reintroduced at their new location in the core of the reactor. Similarly, the new combustible assemblies receive their control cluster or sealing cluster at the corresponding equipment zone before being taken by the bridge and introduced into the reactor.

It is seen that each definitive lifting operation for replacement or each transposition leads to two displacements of the bridge between the reactor and the equipment zone which considerably lengthens the time of operations for renewing the combustible material and requires personnel to drive the bridge and the auxiliary apparatus for handling the clusters at the equipment zones.

SUMMARY OF THE INVENTION

An object of the present invention is to provide an improved charging machine assuring a simplification of the charging operations and thereby a substantial gain in time and personnel.

The invention contemplates a charging machine for a nuclear reactor in which the combustible assemblies are partially changed during each recharging with transposition of the positions of the assemblies in the core of the reactor, the combustible assemblies being equipped with auxiliary clusters along their position in the core, such as control clusters, consumable poison clusters or sealing clusters, the manipulation being effected from a rolling bridge traveling above the pool of the reactor.

According to the invention, the carriage of the rolling bridge is equipped with a turnable platform carrying a plurality of vertical telescopic manipulation arms having means for grappling and raising each adapted either to the manipulation of a complete assembly with its auxiliary cluster or to the manipulation of at least one type of auxiliary cluster, the turnable platform comprising as many angular stop positions as there are telescopic arms, to take each arm to a single active fixed position with respect to the carriage, means being provided to only permit the movement of the single arm situated in active position.

According to a preferred embodiment of the invention, the machine comprises three manipulation arms one for the manipulation of complete assemblies, one for the manipulation of the control clusters, the third for the manipulation of the sealing clusters and the consumable poison clusters.

BRIEF DESCRIPTION OF THE DRAWINGS

The invention is now going to be described in greater detail with reference to a particular embodiment given by way of example and shown in the attached drawings.

DETAILED DESCRIPTION

Figure 1:
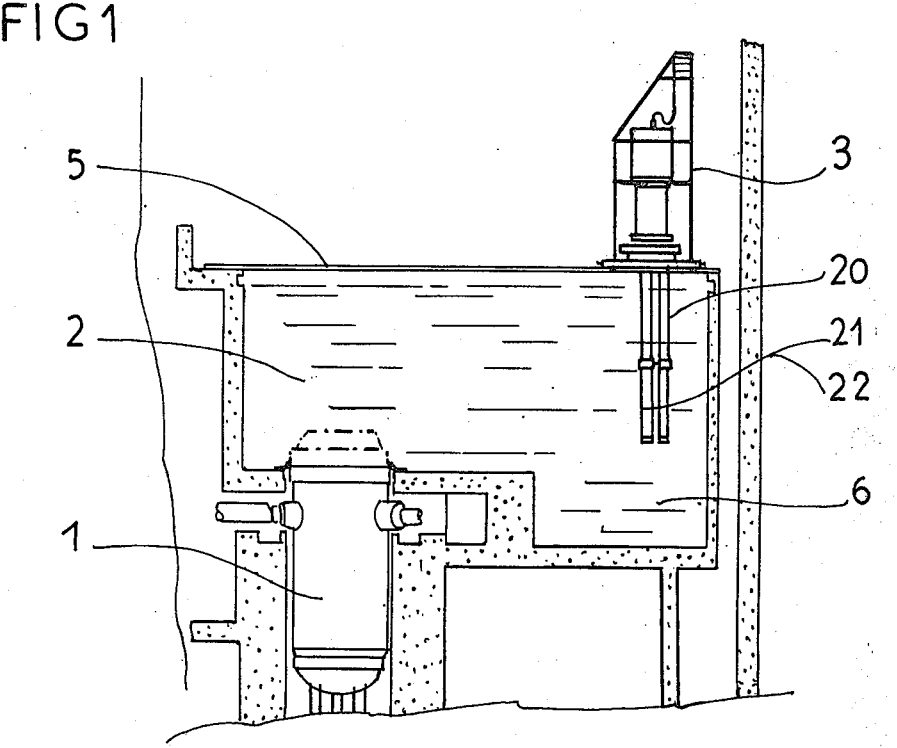
FIG. 1 is a partial view of the main building of a nuclear reactor showing the relative position of the machine according to the invention with respect to the vessel of the reactor.

Referring first to FIG. 1 which shows in simplified manner a portion of the building forming the chamber of the reactor, the vessel 1 of the reactor which occupies the center of the building is shown here in readiness for a recharging operation, i.e. with its cover removed along with the upper apparatus for control of the control rods. The plane of the upper joint of the vessel on which the cover normally bears is then level with the bottom of the pool 2 of the reactor. During all of the recharging operations, the pool 2 is filled with boron-containing water. The manipulation device 3 which is the subject of the invention travels in the manner of a rolling bridge on the rails 5 just above the upper level of the pool. The device 3 can therefore be displaced between a position situated above the vessel of the reactor and another position above a trench of the pool where racks are provided to form transit stations for new combustible assemblies before they are put in place in the reactor or for spent combustible assemblies for evacuation.

Figure 5:
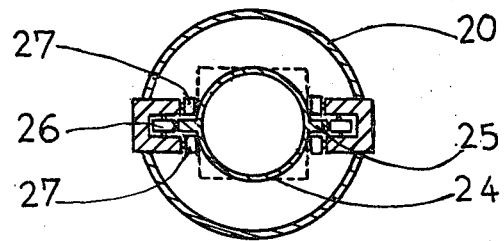
FIG. 5 is a section taking along line V—V in FIG. 2 showing the interior disposition of the three telescopic arms.
Figure 5:
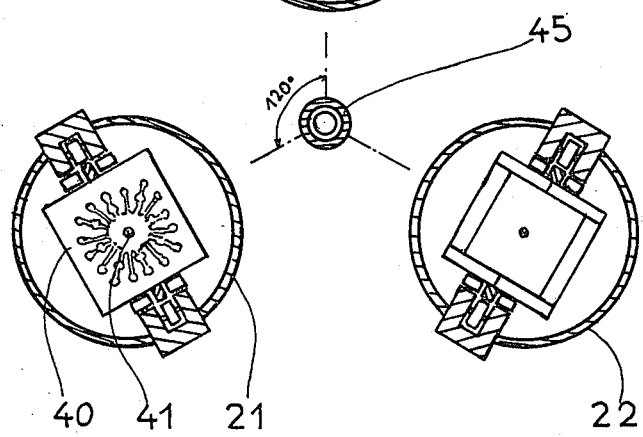
Figure 3:
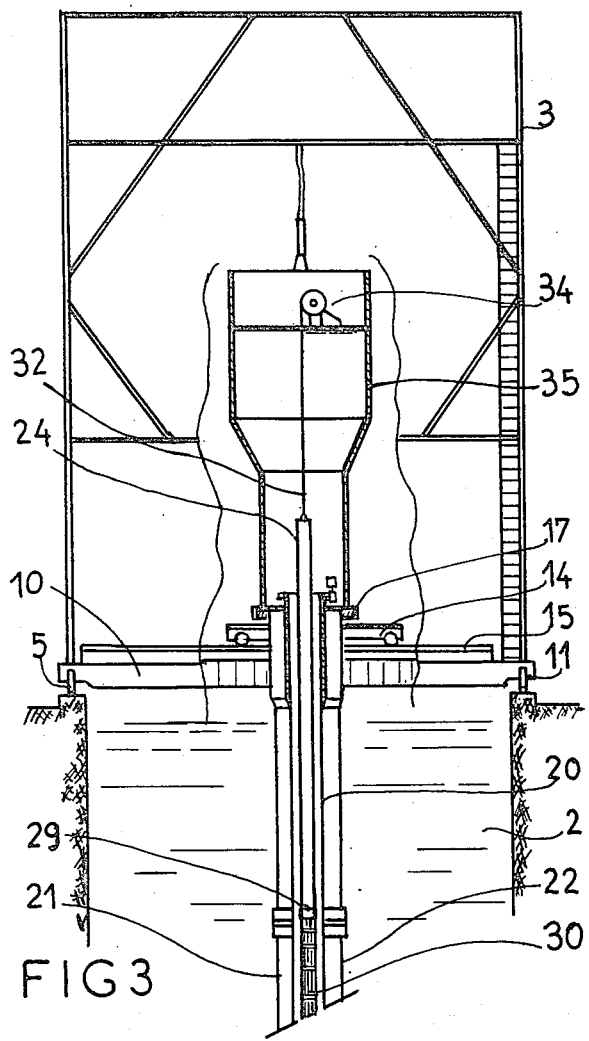
FIG. 3 is a front view partially broken away in section of the rolling bridge and rails showing the telescopic arms retracted.
Figure 4:
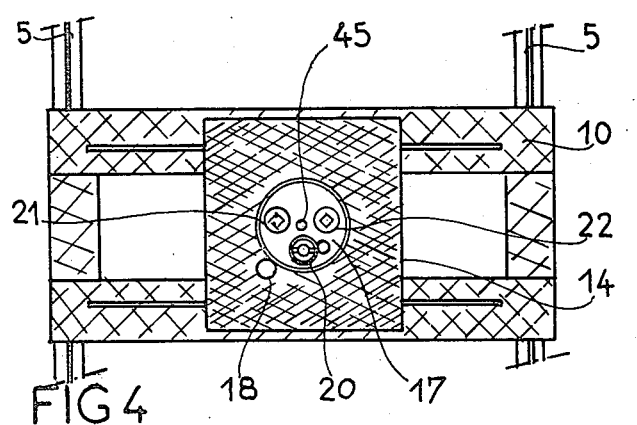
FIG. 4 is a plan view of the platform of the rolling bridge with the upper superstructure removed.

Reference is now made to the assembly in FIGS. 3-5 for the description of the manipulation device itself designated generally by reference numeral 3 in FIG. 1. As in the machines previously utilized, the device comprises a main platform 10 forming a beam for the rolling bridge which rolls on rails 5 by wheels 11. Taking into account the scale of the drawings and in order not to encumber the figures, neither the motors nor the drive apparatus for the longitudinal displacement of the assembly on the rails 5 is shown. Such apparatus is of conventional type for rolling bridges. Similarly, there is not shown in detailed fashion the means for effecting transverse displacement of the carriage 14 on the rail 15 carried by the platform 10, the carriage 14 being displaced in the same fashion as on a conventional rolling bridge.

The carriage 14 supports a turnable turret 17 which can be driven in rotation by means of a reduction motor assembly 18 driving in conventional fashion a pinion in mesh with an exterior toothed ring around the turret 17. The turret 17 carries three vertical tubular masts 20,21, and 22 angularly equidistant with respect to the axis of rotation of the turret 17 and cross braces 23 connecting the masts. The assembly carrying mast 20 is adapted, as in conventional recharging machines, to manipulate the complete combustible assemblies, i.e. with their auxiliary cluster. For this purpose, the mast 20 comprises an interior tubular telescopic element 24 (FIG. 5) which includes longitudinal ribs 25 guided along the length of tube 20 by radial rollers 26 and lateral rollers 27. The lower portion of the telescopic tube 24 is provided with a mouth forming a grapple 29 which can be adapted to the upper portion of a complete assembly 30. Lifting is effected by a cable 32 fixed to the tube 24 and operable from a winch 34 disposed in a tower 35 forming the superstructure of the turret 17 and turnable therewith.

From a totally retracted position, the operation of taking an assembly is effected by unwinding the cable 32. The tube 24 descends to the point where the grapple 29 centers itself by bearing on the extremity of the assembly 30 and engages the assembly thereat. Of course, the locking of the grapple 29 is remotely controlled by electrical and pneumatic means and the tower 35 also supports unwinders for the electrical and pneumatic supply channels in order to permit them to follow the movements of raising and lowering the telescopic tube 24 and the grapple 29.

In the raised position, the assembly of the tube 24 and the assembly 30 is displaced as a unit up to the extreme position shown in FIG. 3 in which the assembly 30 penetrates totally into the tube 20. In this position, the machine can be freely displaced above the pool of the reactor, no element then projecting below the lower level of the tubes 20, 21 and 22 which are situated above the upper level of the vessel.

The mast 21 is equipped in similar manner for the manipulation of the control clusters. Here the telescopic element sliding in the tube 21 and guided by the same type of rollers distributed along the length of the tube is constituted by a series of grills 40 connected by crosspieces, the cut in each grill following the envelope of the absorbent rods and the star branches which connect them at their upper portions to the grapple member. The tube 21 is also associated with a lifting cable 41 and a locking grapple. The cable 41 is operated from a winch disposed in the superstructure 35 in the same manner as the winch 34 associated with the tube 20.

Upon decent of the cable 41, the guide member with grills 40 descends, first to come to bear on the head of the assembly then the grappling apparatus continues to descend in the guide up to its locking on the cluster.

In raising the control rods, the assembly 40 first rests fixed by bearing on the assembly and serves to guide the assembly of the rods of the control cluster; when this is entirely supported by the grills 40 the assembly is raised as a unit to totally penetrate into the tube 21 thus leaving all freedom of movement to the assembly of the manipulation machine 3.

In a further analogous fashion, the mast 22 is equipped with a lower telescopic element, a cable and a raising grapple with special accessory devices determined for the manipulation of the clusters of consumable poisons or of sealing clusters.

Figure 2:
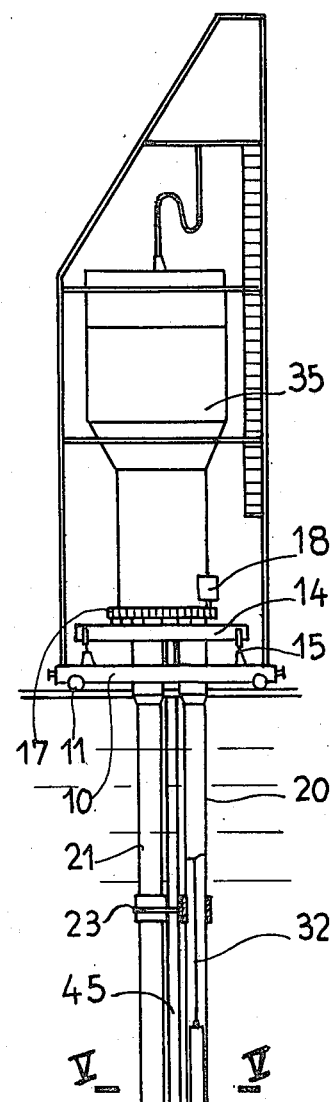
FIG. 2 is a side view taken perpendicular to the rails of the bridge showing the manipulation arms of a complete assembly in deployed position.

The three masts, 20, 21, and 22 are thus each equipped with their proper manipulation means, their telescopic element and their proper cable and raising winch and can each take three positions by rotation of the turret 17. One of these positions, fixed with respect to the carriage, is an active work position where the manipulations are possible. In FIGS. 2, 3 and 4 it is the mast 20 which occupies the active position. We have not described here the safety locking apparatus which can be of any conventional type adapted to prevent the movement of the mast other than that in the active work position nor those means adapted to prevent the movement of the turret and the carriage whenever the manipulated mast has not been returned to totally retracted position.

The turret 17 also carries, along the axis of rotation, an auxiliary telescopic mast 45 which does not extend beyond the lower level of the tubes 20,21 and 22; in extended position it permits carrying a T.V. camera 46 or the like up to the upper level of the assemblies.

With a machine thus realized according to the invention a complete operation of recharging comprises, for example, the raising of a used combustible assembly, a transposition of the assemblies in the core and the transport of a new combustible assembly effected according to the following sequences after raising the cover of the vessel and the mechanism for control of the control rods.

The machine 3 is taken above an assembly to be raised with the mast 20 in working position. One then raises the used assembly with the sealing cluster with which it has been associated and the assembly is taken to the transfer position where the assembly is deposited into a container. After retracting the telescopic arm 24 and without moving the carriage 14 one can turn the turret 120 degrees to place the arm 22 above the assembly in the container and extract the sealing cluster from the assembly.

The machine 3 is then moved above the vessel to a position above an assembly just completing the second tier of its cycle and still provided with a control cluster. By effecting a new rotation of 120 degrees of the turret 17, the arm 21 is put in working position and it is utilized to raise the control cluster. Without displacing the machine 3 or the carriage 14, by effecting rotation of 120 degrees of the turret the arm 22 already carrying the sealing cluster is brought above the assembly used through the second tier which then receives the sealing cluster for the last tier of its activity in the reactor.

The machine thus carrying a control cluster can then be utilized with its arm 20 which is free to transport a complete assembly from the periphery towards the center of the vessel.

Finally, while carrying a control assembly on the arm 21 the machine is taken to the transfer station above a new assembly while waiting but still without a cluster. The new assembly is then provided with the control cluster by means of arm 21 and the assembly is raised by the arm 20 to be then taken to its place.

It is seen that there is thus effected with the same machine both transfer or transposition of a complete assembly while also realizing transposition of clusters, mostly in the intermediate time between operations, by a simple rotation of one stage of rotation of the turret 17. All these operations are realized with visual control due to the camera 46 which also permits examination of the state of different clusters in the course of their manipulation.

Of course the sequence described above is only one example from a greater number of possible sequences depending on the particular conditions of use of the reactor and the nature of the different clusters utilized. However, one will find in all cases the same benefit realized from the success of operations by simple rotation of the turret without having to displace the bridge 10 or the carriage 14. As a consequence, a substantial gain of time is first obtained in the operations of recharging but additionally the possibility is achieved of effecting these diverse manipulations with a single operator. The simultaneous reduction of the number of persons necessary to enter the chamber of the reactor and the time during which it must close down is an important safety factor in the protection against radiation.

Of course, the invention is not strictly limited to the single embodiment which has been described by way of example but it also covers embodiments which differ only by details and variants of execution or by the utilization of equivalent means. One could thus also imagine an analogous machine with four arms on the turret, each arm then having a still more powerful specialization.

What is claimed is:

1. Apparatus for charging a nuclear reactor disposed at the bottom of a pool and constituted by a plurality of tiers of combustible assemblies having different stages of enrichment, each assembly having combustible rods and an auxiliary cluster associated with the particular tier of the assembly, said apparatus comprising a rolling bridge supported for movement in a plane above the pool, a turnable platform on said bridge having an axis of rotation, three vertical telescopic manipulation arms on said platform arranged in angular spaced relation thereon around the axis of rotation of said platform, each arm carrying a respective grappling means, the grappling means for one arm being constructed to engage a complete combustible assembly, the grappling means of the second arm being constructed to engage a first type of cluster and the grappling means of the third arm being constructed to engage a second type of cluster, said turnable platform having the same number of angular stop positions as there are telescopic arms and further having an active position at which each telescopic arm is selectively fixed in operative position while at the other angular positions the arms are inactive, and means for extending and retracting each of the telescopic arms at said active position comprising a self-contained winch for each arm.

2. Apparatus as claimed in claim 1 wherein said manipulation arms are angularly spaced equally around said axis of rotation of said platform such that with the bridge at rest as said platform is successively rotated through said stop positions said arms successively pass through said operative positions at precisely the same vertical position and the grappling means on the respective arms can operatively coact with the rods and cluster of each assembly.

3. Apparatus as claimed in claim 1 comprising an auxiliary mast secured to said carriage at the axis of rotation of said platform, said mast projecting vertically between said arms, and camera means on said auxiliary mast.

4. Apparatus as claimed in claim 3 wherein said arms and mast extend vertically downwards, said mast extending to a level above the lowermost extended position of each arm.

* * * * *

UNITED STATES PATENT AND TRADEMARK OFFICE
CERTIFICATE OF CORRECTION

PATENT NO. : 4,308,100
DATED : December 29, 1981
INVENTOR(S) : Michel Albin

It is certified that error appears in the above-identified patent and that said Letters Patent is hereby corrected as shown below:

On The Title Page, item (73), "Vaucresson, France" should read -- Courbevoie, France --.

Signed and Sealed this

Twentieth Day of July 1982

[SEAL]

Attest:

Attesting Officer

GERALD J. MOSSINGHOFF

*Commissioner of Patents and Trademarks*